United States Patent
Chao

(10) Patent No.: US 8,000,552 B2
(45) Date of Patent: Aug. 16, 2011

(54) IMAGE SCALING METHOD AND RELATED APPARATUS

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1191 days.

(21) Appl. No.: 11/684,647

(22) Filed: Mar. 12, 2007

(65) Prior Publication Data

US 2007/0217711 A1  Sep. 20, 2007

(30) Foreign Application Priority Data

Mar. 17, 2006  (TW) ............................. 95109329 A

(51) Int. Cl.
- *G06K 9/32* (2006.01)
- *G06K 9/40* (2006.01)
- *H04N 5/00* (2006.01)

(52) U.S. Cl. ........ 382/261; 382/299; 382/254; 382/260; 382/262; 382/263; 382/264; 348/606; 348/607; 348/610

(58) Field of Classification Search .................. None
See application file for complete search history.

(56) References Cited

U.S. PATENT DOCUMENTS

| | | | |
|---|---|---|---|
| 5,204,678 A * | 4/1993 | Foley | 341/152 |
| 5,739,867 A | 4/1998 | Eglit | |
| 6,181,835 B1 | 1/2001 | Hamill | |
| 6,339,434 B1 | 1/2002 | West | |
| 6,348,929 B1 | 2/2002 | Acharya | |
| 6,577,322 B1 * | 6/2003 | Fukuda | 345/698 |
| 7,379,105 B1 * | 5/2008 | Frank et al. | 348/242 |
| 7,590,300 B2 * | 9/2009 | Tadas et al. | 382/260 |
| 7,755,701 B2 * | 7/2010 | Kondo | 348/458 |
| 7,876,833 B2 * | 1/2011 | Segall et al. | 375/240.24 |
| 2002/0106026 A1 * | 8/2002 | Demmer | 375/240.17 |
| 2002/0180746 A1 | 12/2002 | Yasui | |
| 2002/0180887 A1 | 12/2002 | Kim | |
| 2003/0085912 A1 | 5/2003 | Soo | |
| 2004/0237103 A1 * | 11/2004 | Kondo et al. | 725/37 |
| 2005/0013363 A1 * | 1/2005 | Cho et al. | 375/240.12 |

FOREIGN PATENT DOCUMENTS

JP  4-018884  1/1992

* cited by examiner

*Primary Examiner* — Vikkram Bali
*Assistant Examiner* — Michelle Entezari
(74) *Attorney, Agent, or Firm* — Winston Hsu; Scott Margo

(57) ABSTRACT

An apparatus for scaling an input image is disclosed. The apparatus includes a resolution determining circuit and a scaler. The determining circuit determines the resolution of the input image. The scaler includes a scaling filter with an adjustable number of filter taps and scales the input image to output scaled pixels, wherein an amount of taps of scaling filter corresponds to the resolution of the input image.

14 Claims, 5 Drawing Sheets

| Horizontal resolution of the input image | Interpolation parameter | The content of the buffer | Required storage space of the buffer |
|---|---|---|---|
| 320 | 13 | 12 horizontal lines (each line have 320 pixel data) | 3840 pixel data |
| 640 | 7 | 6 horizontal lines (each line have 640 pixel data) | 3840 pixel data |
| 960 | 5 | 4 horizontal lines (each line have 960 pixel data) | 3840 pixel data |
| 1280 | 4 | 3 horizontal lines (each line have 1280 pixel data) | 3840 pixel data |
| 1600 | 3 | 2 horizontal lines (each line have 1600 pixel data) | 3200 pixel data |

Fig. 5

IMAGE SCALING METHOD AND RELATED APPARATUS

BACKGROUND OF THE INVENTION

1. Field of the Invention

The invention relates to an image data processing, and more particularly, to an image scaling processing.

2. Description of the Prior Art

Display apparatus such as TVs, LCD monitors, plasma monitors, and projectors, etc. can be used for displaying static images or dynamic videos. Different video formats usually have different resolutions. For example, the resolution of Video Graphics Array (VGA) is 640*480. The resolution of a Super Extended Graphics Array (SXGA) is 1280*1024. Under the condition that the resolution of the display apparatus is different from the resolution of the received video signals, the received input video images must first be scaled in order to display the correct video images.

The conventional scaling method can use a frame buffer or a line buffer to store the received frame and scales (ex: perform an interpolation operation) a plurality of pixels of the received frame from the frame buffer or the line buffer.

In the above-mentioned conventional method, an interpolator which includes a scaling filter having a fixed number of filter taps is used to perform the interpolation operation. Take the filter having 5 fixed taps as an example. Every time generation of an output horizontal line is required, the 5 taps of the scaling filter are used to respectively receive 5 input horizontal lines in the input video (ex: 4 of the input horizontal lines are already received and stored in the four line buffers, and another horizontal line is the input scan line currently being received). In order to complete the above-mentioned interpolation operation, the conventional scaling apparatus must have at least 4 horizontal line buffers, wherein each of the scan line buffers has a storage space for storing an input horizontal line. However, since the input video may have various different format (resolutions) and the image scaling apparatus need to be able to process the input videos with said various different resolutions, the strictest condition (i.e. the condition where the input video has the largest resolution) has to be considered when designing the image scaling apparatus. For example, if the input maximum resolution that the conventional scaling apparatus can process is 1920*1080, and the amount of the tap of the scaling filter of the conventional scaling apparatus is fixed to be 5, then the conventional apparatus must have at least 4 line buffers where each line buffer can store 1920 pixel data. In other words, a storage space of the conventional apparatus that can store 7680 pixel data in total is required, and this is a large hardware cost. In this example, when the conventional scaling apparatus receives an input image which has 640*480 resolution, the storage space of the conventional apparatus that can store 7680 pixel data only store 2560 (640×4) pixel data because the tap of the scaling filter of the conventional apparatus is fixed to be 5. Furthermore, the quality of the scaled image is better when the number of filter taps of the scaling filter is larger.

SUMMARY OF THE INVENTION

It is therefore one of the objectives of the present invention to provide an image scaling method and apparatus thereof to solve the above-mentioned problems.

It is therefore one of the objectives of the present invention to provide an image scaling method and apparatus, wherein the number of filter taps of scaling filter of the apparatus can be adjusted to improve the quality of the scaled image and/or efficiently use the storage space of the line buffer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is an example of the interpolation parameter and the buffer receives input images with different resolutions.

DETAILED DESCRIPTION

Figure 1:
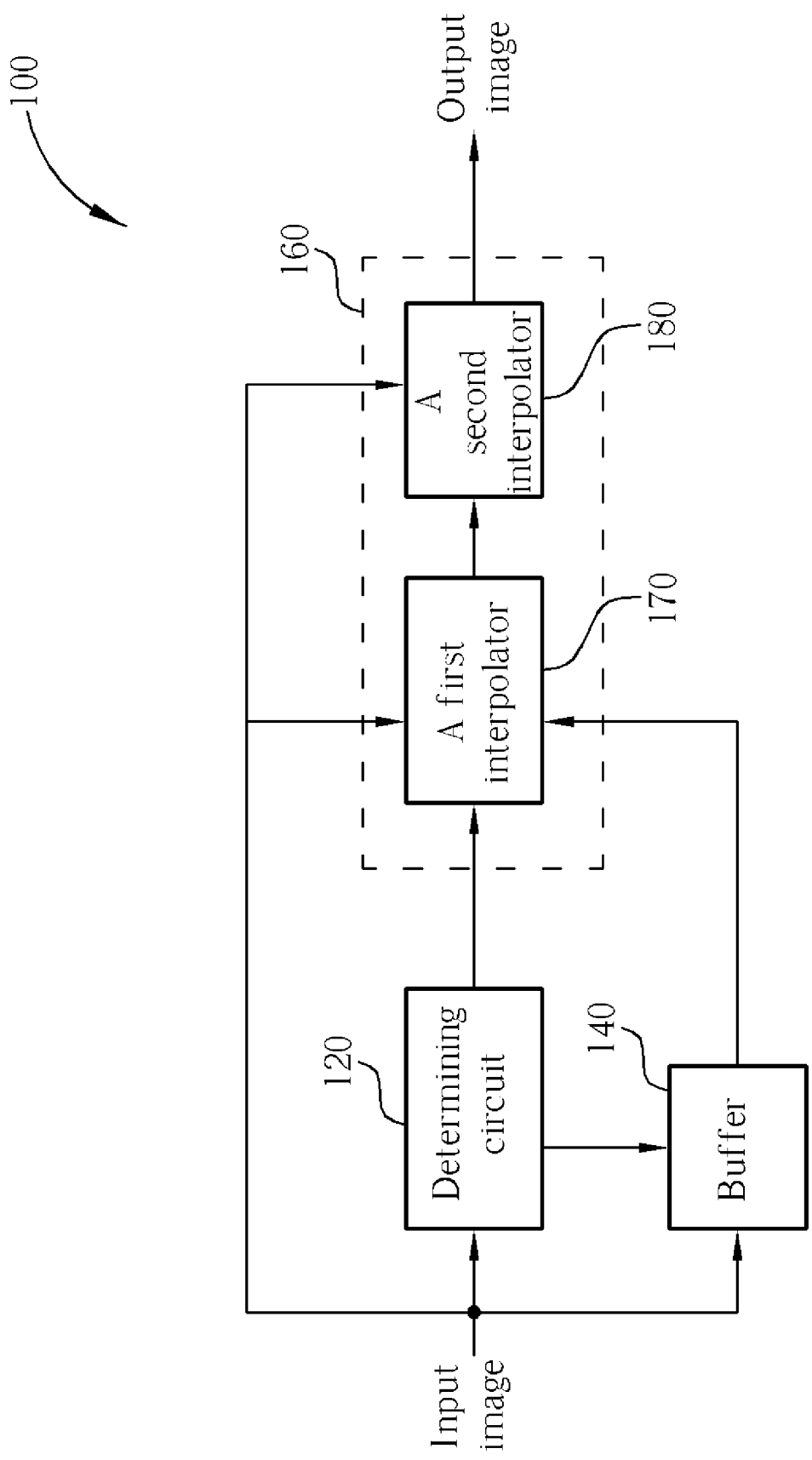
FIG. 1 is a block diagram of an image scaling apparatus according to an embodiment of the present invention.

FIG. 1 is a block diagram of an image scaling apparatus 100 according to an embodiment of the present invention. In this embodiment, the image scaling apparatus 100 includes a determining circuit 120, a buffer 140, and a scaler 160. The scaler 160 includes a first interpolator 170 and a second interpolator 180. In an embodiment, the first interpolator 170 is a vertical interpolator for performing the image scaling process along a vertical direction, and the second interpolator 180 is a horizontal interpolator for performing the image scaling process along a horizontal direction. The vertical interpolator 170 has a plurality of input terminals. In this embodiment, the vertical interpolator 170 comprises a multi-tap scaling filter, and the filter taps of the multi-tap scaling filter are used as a plurality of input terminals of the vertical interpolator respectively. The operation and structure of the scaling filter and the vertical and horizontal interpolators are well known by persons familiar with the related techniques and can be implemented by software or hardware (digital circuit or logic circuit) or both, and therefore additional details of the relative operation theory and steps are omitted for the sake of brevity.

Figure 2:
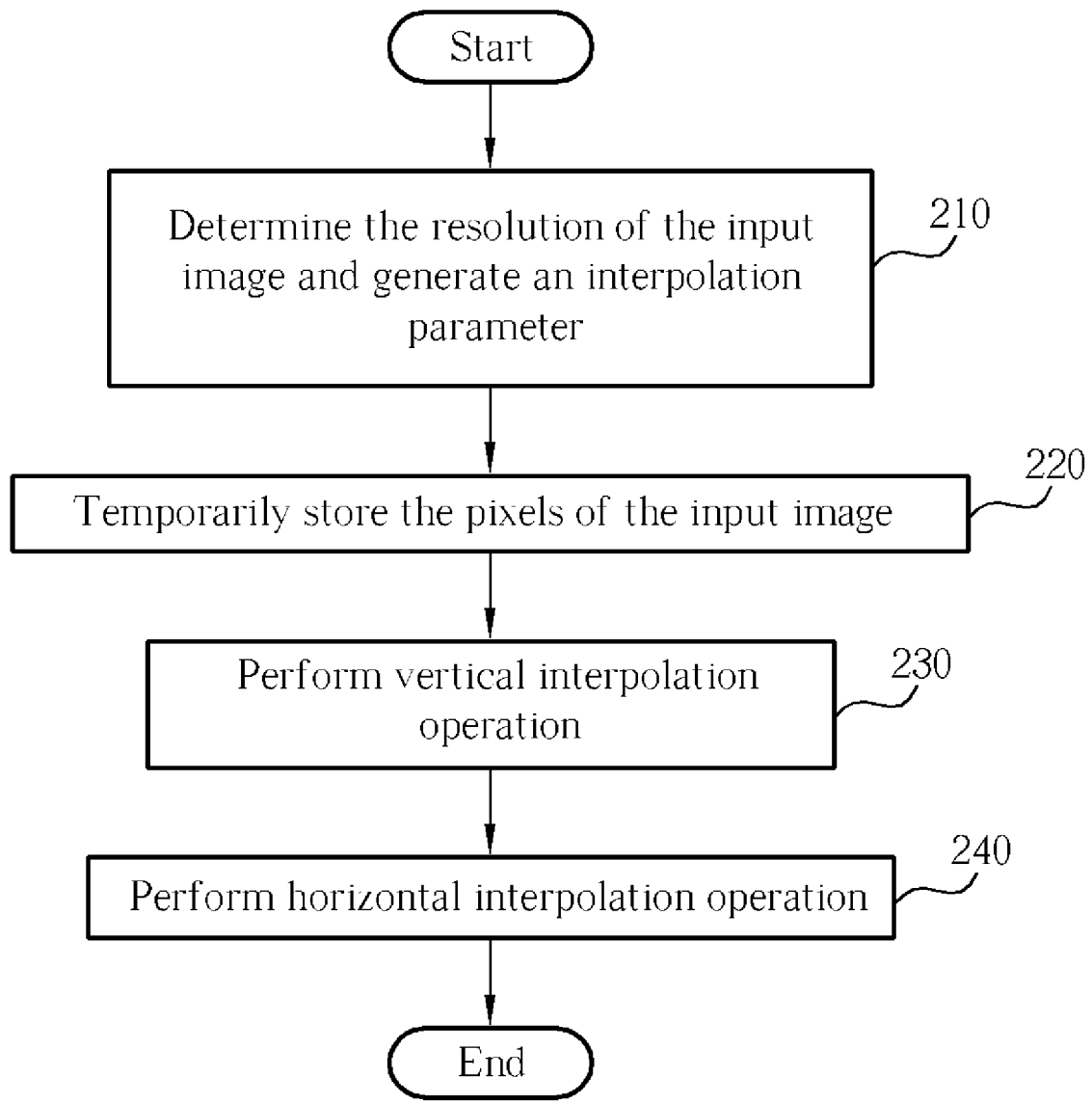
FIG. 2 is an embodiment of a flow chart of the image scaling apparatus shown in FIG. 1.

FIG. 2 is an embodiment of an operation flow chart of an image scaling apparatus 100 of this invention. First, in step 210, the determining circuit 120 determining the resolution of the input image according to at least one of period of vertical and horizontal synchronization signals or/and the polarity of the vertical and the horizontal synchronization signals of the input image, and determines an interpolation parameter according to the resolution of the input image and the known storage space of the buffer 140, wherein the interpolation parameter is used for indicating the number of the input terminals of the vertical interpolator 170 (i.e. the amount of taps used for receiving the input pixels in the multi-tap filter mentioned above). The resolution detecting method is well known by persons familiar with the related techniques, and therefore additional details of the relative operation theory and steps are omitted for the sake of brevity. Therefore, when the input image has different horizontal resolutions, the multi-tap filter in the vertical interpolator 170 will be able to use different amounts of taps to receive the pixels in the input image in order to carry out the interpolation operation of the input pixels. For example, if the buffer 140 has a storage space for storing 3840 pixel data, then when the horizontal resolution of the input image is 320, 640, 960, 1280, or 1600 pixels, the determining circuit 120 can determine the interpolation parameter to be 13, 7, 5, 4, or 3 respectively. That is, the multi-tap filter in the vertical interpolator 170 will use 13, 7, 5, 4, or 3 taps to receive the pixels in the input image. In other words, when the resolution of the input image is smaller, the multi-tap filter in the vertical interpolator 170 uses more taps to receive the horizontal lines of the input image such that the quality of the scaled image is better, and when the resolution of the input image is larger, the multi-tap filter in the vertical interpolator 170 uses less taps to receive the horizontal lines of the input image and the large storage space of the buffer 140 can be avoided such that the cost can be decreased.

Step 220: The buffer 140 temporarily stores the input image. When the horizontal resolution of the input image and interpolation parameter are (320, 13),((640, 7), (960, 5), (1280, 4), (1600, 3)), the buffer 140 can temporarily store the pixels of 12 (6, 4, 3, 2) horizontal lines of the input image where each line buffer can store 320 (640, 960,1280, 1600) pixels. Obviously, the above-mentioned method is able to efficiently use of the buffer 140.

Step 230 and step 240 are operations of the vertical interpolator 170 and the horizontal interpolator 180. Here, the resolutions of the input image and the output image are assumed to be 640*480 and 1280*1024 respectively. In step 230, the vertical interpolator 170 controls the multi-tap scaling filter according to the interpolation parameter. Suppose the resolution of the input image is 640*480, the multi-tap filter of the interpolator will use 7 taps for receiving the pixels of the 7 horizontal lines of the input image, respectively. More precisely, the vertical interpolator 170 has to perform the vertical interpolation operation on 7 horizontal lines of the input image to generate an intermediary image having a resolution of 640*1024. According to a plurality of pixels in the 7 scan lines received by the 7 filter taps, the multi-tap filter can use an interpolation rule to perform the interpolation operation on the pixels to generate a scaled horizontal line in the intermediary image, wherein the interpolation rule can utilize any kinds of conventional interpolation techniques. In a preferred embodiment, a multi-tap filter can use the detection result of an edge detector to obtain an edge direction, and the multi-tap filter can use a pre-determined interpolation rule corresponding to the edge direction to perform the interpolation operation. In an embodiment, weight values of the interpolation operation can be different and correspond to each corresponding pixel according to the interpolation rule. Of course, the method mentioned above is only an illustration, and is not a limitation of the present invention.

In step 240, taking the assumption in the previous paragraph as an example, the horizontal interpolator 180 has to perform the horizontal interpolation operation on each horizontal line in the intermediary image having a resolution of 640*1024 to generate the final output image having a resolution of 1280*1024. In this embodiment, the horizontal interpolator 180 includes a FIFO buffer and a multi-tap filter (not shown), and the multi-tap filter the horizontal interpolator 180 can be a fixed amount or an unfixed amount of filter taps of the multi-tap filter.

The method of the horizontal and the vertical interpolation operation is well known by persons familiar with the related techniques, and therefore additional details of the relative operation theory and steps are omitted for the sake of brevity.

FIG. 2 is only one illustration, and in reality, step 240 can be performed together with step 230 or before step 230 is performed instead of being performed after step 230 is completed. After understanding the operation method and theory of the embodiment of the present invention, a person of average skill in the pertinent art should be able to perform the disclosed method in a different way from the flow chart from FIG. 2.

Figure 3:
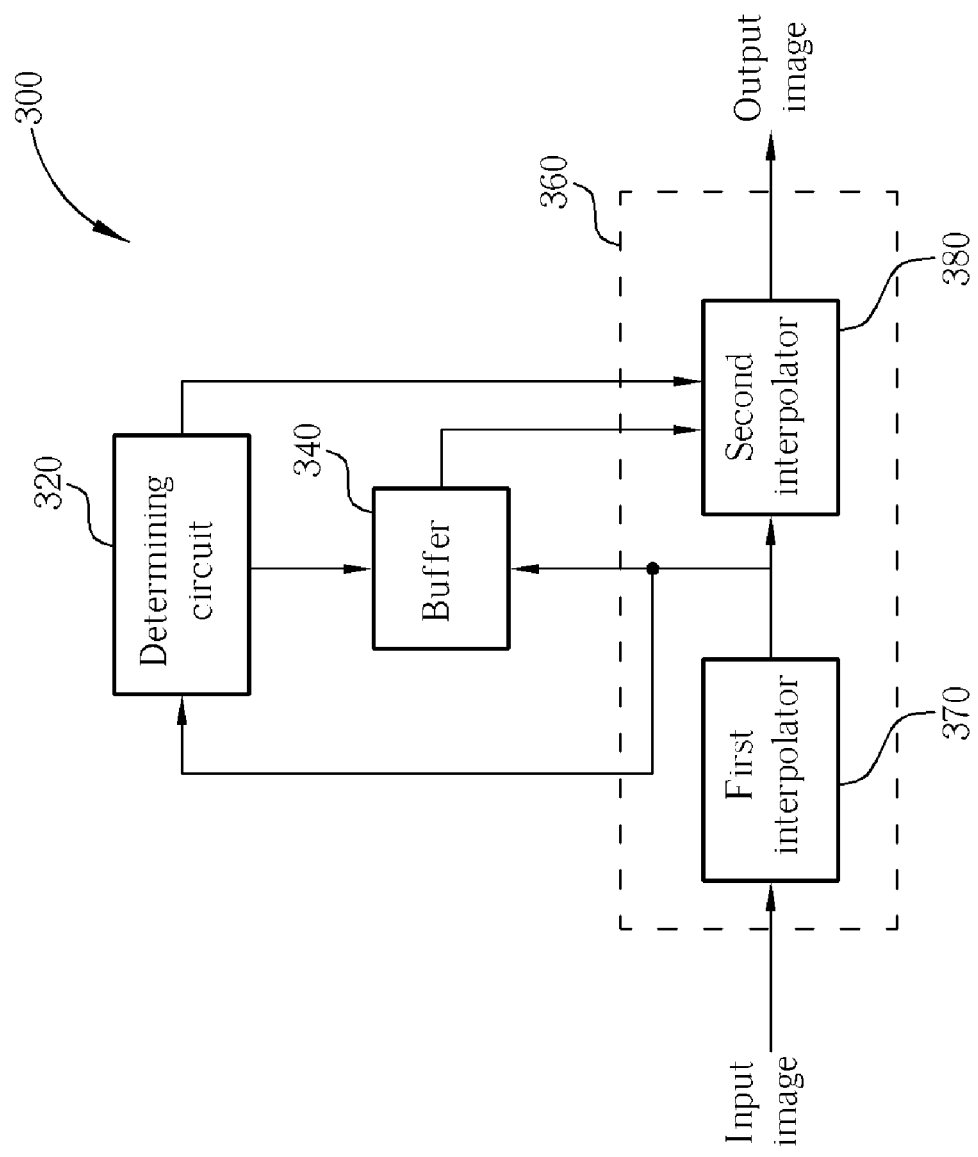
FIG. 3 is a block diagram of an image scaling apparatus according to another embodiment of the present invention.

FIG. 3 is a block diagram of an image scaling apparatus according to another embodiment of the present invention. In this embodiment, the image scaling apparatus 300 includes a resolution determining circuit 320, a buffer 340, and a scaler 360. The scaler 360 includes a first interpolator 370 and a second interpolator 380. In this embodiment, the first interpolator 370 is a horizontal interpolator, and the second interpolator 380 is a vertical interpolator. The vertical interpolator 380 has a plurality of input terminals. In this embodiment, the interpolation unit is a multi-taps scaling filter. The structure and operation of corresponding elements in FIG. 3 are substantially similar to the corresponding elements in FIG. 1, and therefore additional details of the relative operation theory and steps are omitted for the sake of brevity.

Figure 4:
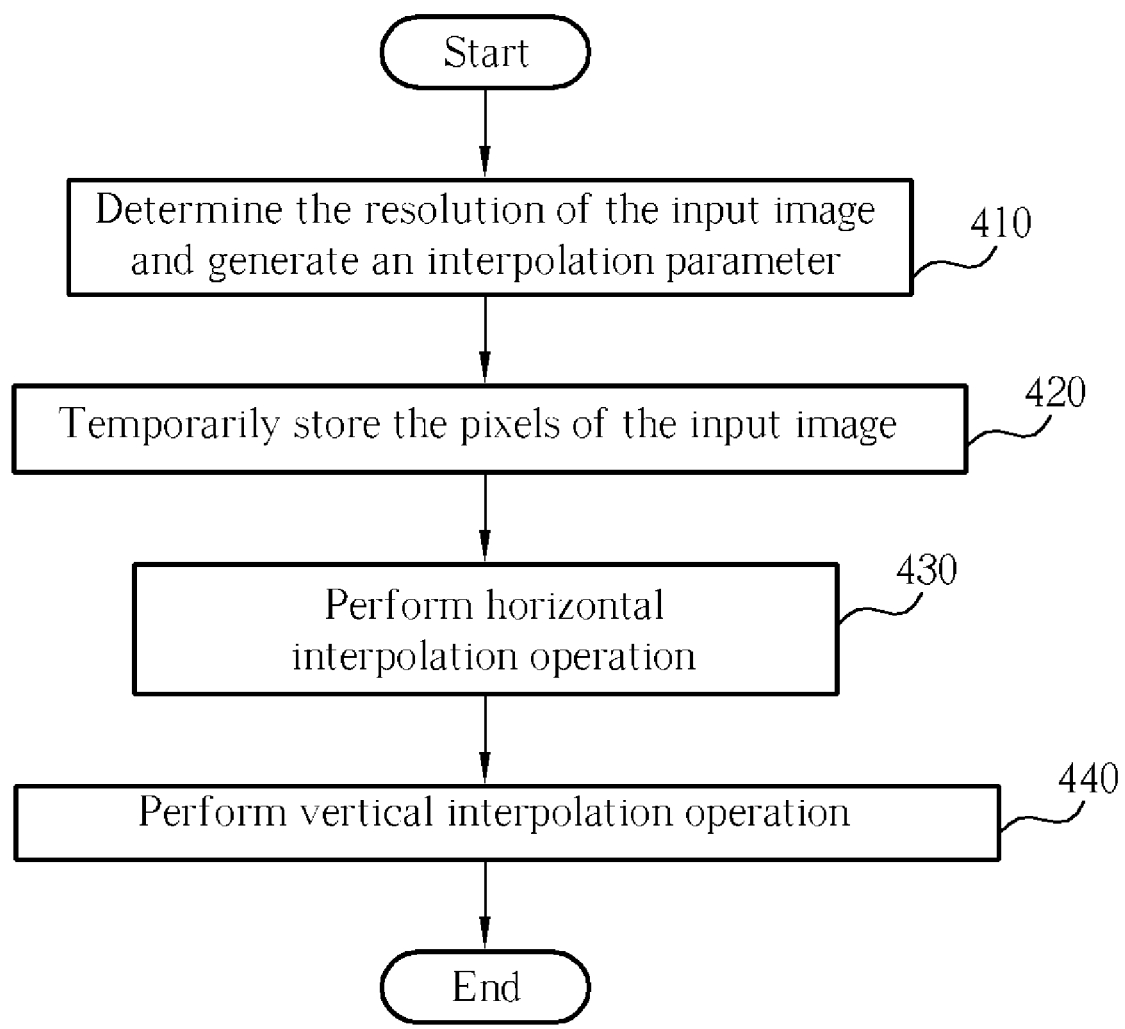
FIG. 4 is an embodiment of a flow chart of the image scaling apparatus shown in FIG. 3.

FIG. 4 is an embodiment of an operation flow chart of an image scaling apparatus 300 in the embodiment mentioned above. The step 410 is used for determining the resolution of the input image and generating an interpolation parameter. The step 410 in FIG. 4 is substantially the similar to the step 210 in FIG. 2, and therefore additional details of the relative operation theory and steps are omitted for the sake of brevity.

In step 420, the buffer 340 temporarily store the pixels of the input image. The step 420 in FIG. 4 is substantially the similar to the step 220 in FIG. 2, and therefore additional details of the relative operation theory and steps are omitted.

Step 430 is step of performing horizontal interpolation operation. The step 430 in FIG. 4 is substantially the similar to the step 240 in FIG. 2, and therefore additional details of the relative operation theory and steps are omitted. Step 440 is step of performing vertical interpolation operation. The step 430 and the step 440 in FIG. 4 are substantially the similar to the step 240 and the step 230 in FIG. 2, respectively, and therefore additional details of the relative operation theory and steps are omitted.

Of course, the above-mentioned method is only an illustration, and is not a limitation of the present invention. After understanding the operation method and theory of the embodiment of the present invention, a person of average skill in the pertinent art should be able to carry out the disclosed method in a different way from the flow chart shown in FIG. 4.

FIG. 5 is an example of the interpolation parameter determined by the determining circuit 120, 320 and the buffer 140, 340 for storing the pixel data of the plurality of horizontal lines of input image when the vertical interpolator in the two embodiments mentioned above receive the input images with different resolutions. FIG. 5 shows that, in the methods provided by the two embodiments, when the horizontal resolution of the image received by the image scaling apparatus 100, 300 is smaller, a larger value can be used as the interpolation parameter, and when the horizontal resolution of the image received by the image scaling apparatus 100, 300 is larger, a smaller value can be used as the interpolation parameter. In other words, both the image scaling apparatus in these two embodiments can select a better value as the amount of the filter tap for performing the vertical or/and horizontal interpolation operation according to the at least one horizontal or/and vertical resolution of the image received by the image scaling apparatus. Please note that the methods of the embodiments mentioned above are not limitations of the present invention. As long as a method performs the interpolation operation with different interpolation parameter according to the resolution of the input image automatically, then the method falls within the scope of the present invention.

In addition, both buffer modules in the two embodiments only need a storage space that can store 3840 pixel data in total for the operation of the vertical interpolator under various conditions by referring to the examples shown in FIG. 5. Please note that the storage space of 3840 pixels is only an embodiment of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for scaling an input image along a first direction of the input image to generate an output image, the method comprising:

receiving the input image and determining a resolution of the input image;

determining an amount of taps of a multi-tap scaling filter according to the determined resolution of the input image; and scaling the input image and thereby generating the output pixels by utilizing the multi-tap scaling filter.

2. The method of claim 1, further comprising:

temporarily storing the corresponding input pixels of N horizontal lines of the input image, wherein N corresponds to the amount of taps of the scaling filter.

3. The method of claim 1, wherein the first direction corresponds to a vertical direction of the input image.

4. The method of claim 1, the step of determining comprising:

determining the resolution of the input image according to at least one of horizontal and vertical synchronization signals of the input image.

5. An apparatus for scaling an input image along a first direction, the apparatus comprising:

a determining circuit, for determining a resolution of the input image and thereby determining an interpolation parameter; and a scaler, coupled to the determining circuit, comprising a multi-tap scaling filter, the scaler being used for scaling the pixel data of the input image and thereby outputting an output image, wherein an amount of taps of the multi-tap scaling filter is determined by the determining circuit according to the determined resolution of the input image.

6. The apparatus of claim 5, wherein tap number of the multi-tap scaling filter is corresponding to the interpolation parameter.

7. The apparatus of claim 5, wherein the determining circuit determines the resolution of the input image according to at least one of horizontal and vertical synchronization signals of the input image.

8. The apparatus of claim 5, wherein the first direction correspond to a vertical direction of the input image.

9. The apparatus of claim 5, wherein an amount of taps of multi-tap scaling filter corresponds to the resolution of the input image.

10. The apparatus of claim 5, further comprising:

a buffer, coupled to the determining circuit and the scaler, for temporarily storing pixel data of N horizontal lines of the input image, wherein N corresponds to the interpolation parameter.

11. An apparatus for scaling an input image along a first direction, the apparatus comprising:

a determining circuit, for determining a horizontal resolution of the input image, thereby determining an interpolation parameter, wherein the interpolation parameter increases when the horizontal resolution decreases; and a vertical interpolator, coupled to the determining circuit, comprising a multi-tap scaling filter, wherein an amount of taps of the multi-tap scaling filter is equal to the interpolation parameter, and the vertical interpolator receives pixels of the input image by utilizing the multi-tap scaling filter in order to carry out an interpolation operation of the pixels and thereby outputting an output image.

12. The apparatus of claim 11, further comprising:

a buffer, coupled to the determining circuit and the vertical interpolator, the buffer having a storage space for temporarily storing the pixels of the input image.

13. The apparatus of claim 12, wherein the buffer is utilized for providing a first amount of line buffers according to the horizontal resolution of the input image and the interpolation parameter, and registering the pixels of the input image by utilizing the first amount of line buffers, and the first amount increases when the interpolation parameter increases, and storage space of each line buffer decreases when the first amount increases.

14. The apparatus of claim 13, wherein the first amount is one less than the interpolation input amount, and each line buffer can store at least a horizontal scan line of the input image.

* * * * *